United States Patent
Romberg

[15] 3,683,554
[45] Aug. 15, 1972

[54] VEHICLE ACTUATED AUTOMATIC GATE

[72] Inventor: Felix B. Romberg, P.O. Box 218, Holland, Tex. 76534

[22] Filed: Jan. 15, 1971

[21] Appl. No.: 106,807

[52] U.S. Cl. .......................... 49/272, 49/364, 16/75
[51] Int. Cl. ............................................. E05f 13/00
[58] Field of Search........ 49/364, 262, 263, 242, 273, 49/279, 272; 16/75

[56] References Cited

UNITED STATES PATENTS

| | | | |
|---|---|---|---|
| 2,076,092 | 4/1937 | Pinard | 49/364 X |
| 2,691,836 | 10/1954 | David | 49/364 X |
| 2,718,079 | 9/1955 | Strey | 49/364 |
| 3,378,953 | 4/1968 | Barrowclough | 49/364 |
| 3,490,175 | 1/1970 | Romberg | 49/364 |

*Primary Examiner*—Dennis L. Taylor
*Attorney*—Richards, Harris & Hubbard

[57] ABSTRACT

The specification discloses a rectangular gate normally latched at one end and including an initially stressed torsion bar spring horizontally disposed at the other end. When thrust from a vehicle is applied to the gate, the gate yields along the bottom while rotating along an upper horizontal axis, thereby storing energy in the bar spring and releasing the latch. Propelled by the spring stored energy, the released gate then springs about a vertical axis to an open position. The gate includes an improved vertical gate supporting post mechanism, an improved initially stressed torsion bar spring, a vehicle bumper contact device to eliminate scuffing of the vehicle bumper and an improved hooking mechanism to protect a unitary frame connection between the gate ends from additional wire tension.

6 Claims, 24 Drawing Figures

Patented Aug. 15, 1972
3,683,554
5 Sheets-Sheet 1
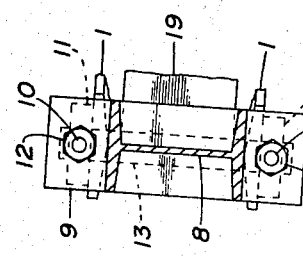
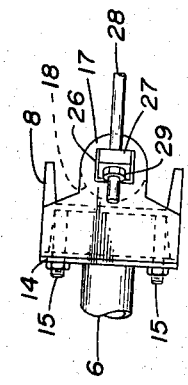
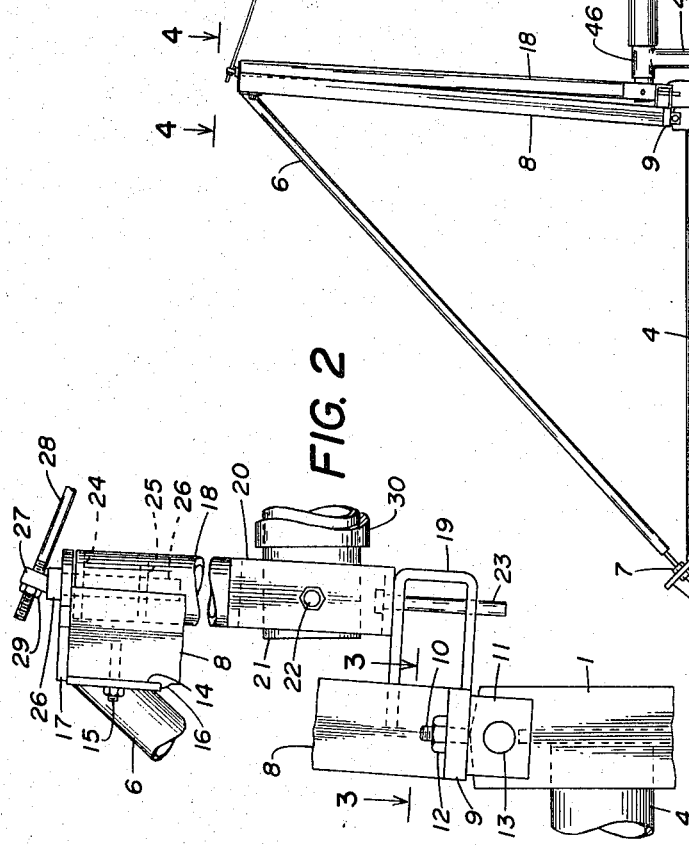
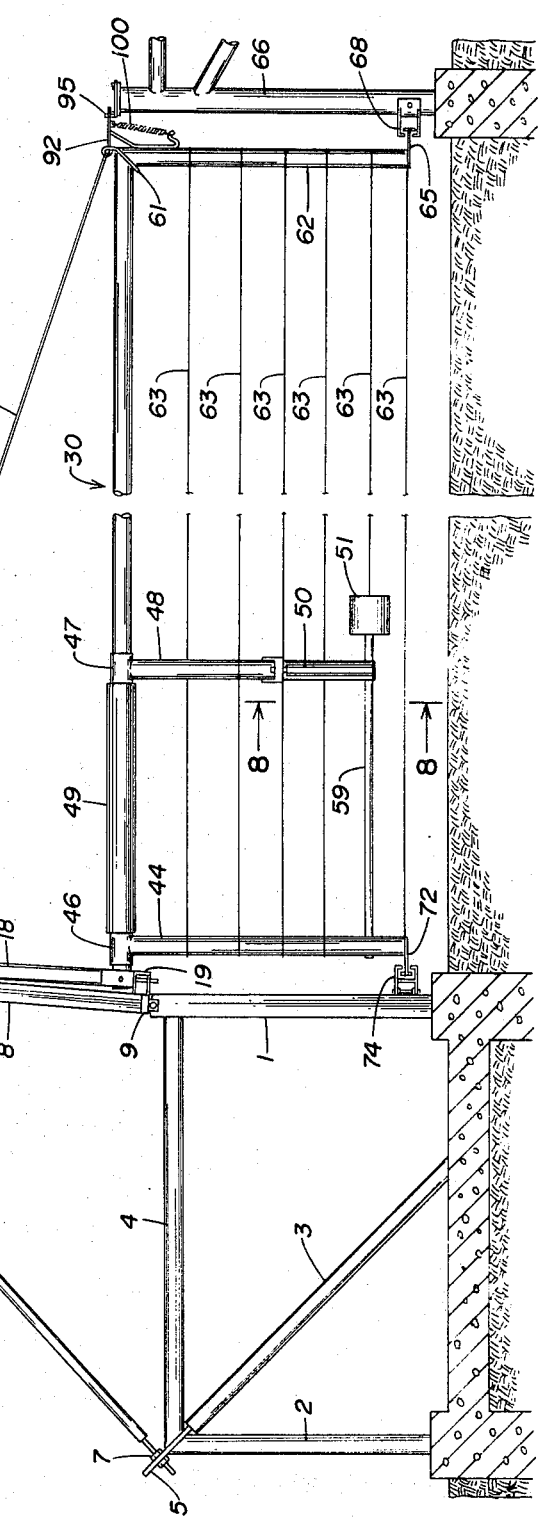
INVENTOR:
FELIX B. ROMBERG
Richards, Harris & Hubbard
ATTORNEYS

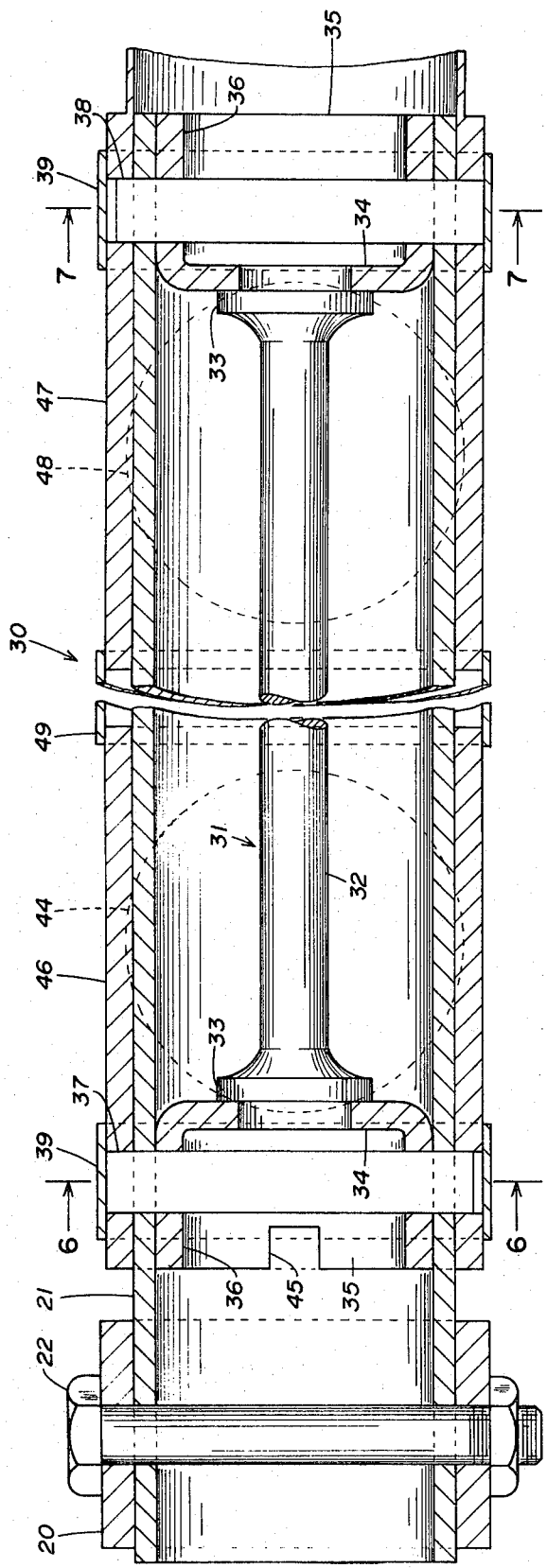

INVENTOR:
FELIX B. ROMBERG

Richards, Harris & Hubbard
ATTORNEYS

Patented Aug. 15, 1972
3,683,554
5 Sheets-Sheet 4
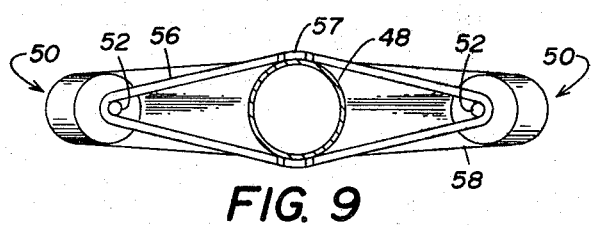
FIG. 9
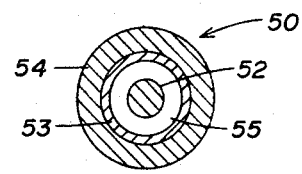
FIG. 11
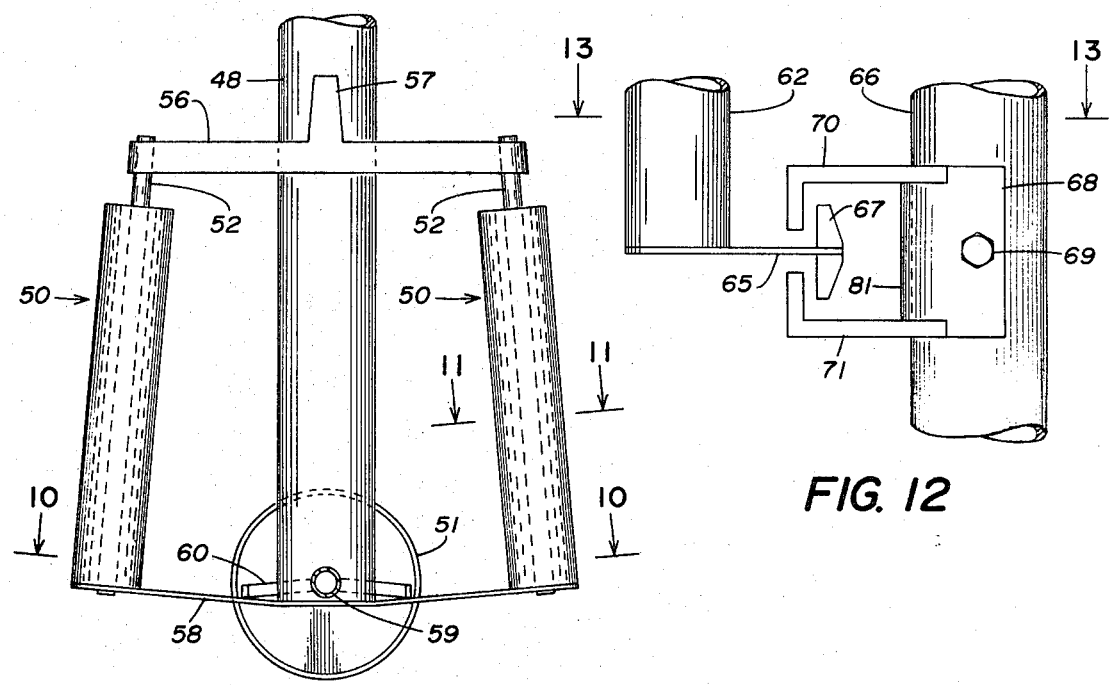
FIG. 8
FIG. 12
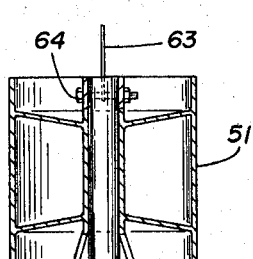
FIG. 10
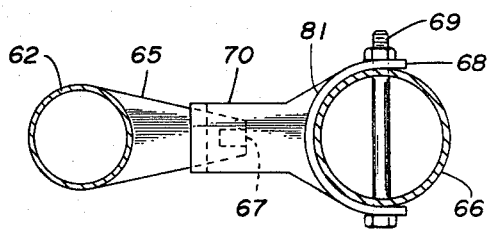
FIG. 13
INVENTOR:
FELIX B. ROMBERG
*Richards, Harris & Hubbard*
ATTORNEYS Patented Aug. 15, 1972

INVENTOR:
FELIX B. ROMBERG

Richards, Harris & Hubbard
ATTORNEYS

VEHICLE ACTUATED AUTOMATIC GATE

RELATED APPLICATION

This application is an improvement over application Ser. No. 3318, filed Jan. 16, 1970, by the present applicant and entitled "Vehicle Opened Gate."

FIELD OF THE INVENTION

The present invention relates to a gate which may be automatically opened and closed by vehicle thrust, and more particularly to an automatic gate which by the application of vehicle thrust yields at the bottom to store spring energy and unlatch, whereupon the gate is flung to an open position by the spring stored energy.

THE PRIOR ART

Automatic bumper actuated gates were generally devised when front bumpers on automobiles were more rugged, more resilient and extended further in front of the auto body shell than the bumpers on todays automobiles. Additionally, automatic gates heretofore developed were usually not designed to accommodate modern width farm equipment.

Many hinged gates have been heretofore constructed of boards or structurally formed sheet metal strips riveted together. Susceptability to wind pressure has often rendered such gates unsuitable for free swinging bumper-actuated gates. Such previous gates have also had poor torsional properties, and have often tended to be rather heavy when used as automatic bumper gates due to the requirement of additional parts and strengthening structure. After a period of service, the weight and leverage of such previously developed gates have often tended to upset the desired axis of rotation.

The present gate operates generally along the lines of the gate disclosed in applicant's copending patent application Ser. No. 3318, filed Jan. 16, 1970, and entitled "Vehicle Opened Gate." The present gate invention, however, is directed to an improved gate supporting structure, an improved initially stressed torsion spring mechanism, novel vehicle contact portions and supplementary gate hook structure.

SUMMARY OF THE INVENTION

The present vehicle operated gate includes an upright post section mounting said gate for rotation from its closed position to its open positions. The post section has a generally horizontal base plate seated on a pair of laterally spaced pivot blocks which pivotally support said post section about a horizontal axis. Each of the pivot blocks includes a threaded member extending through the base plate and a nut provided for connection to the threaded member above the base plate. This structure allows adjustment to accommodate shim buildup between the pivot blocks and the base plate to adjust the posture of the post section in the plane of the threaded members.

In accordance with other aspects of the invention, a gate mounted at one end for rotation about a vertical axis in either direction from a closed position to an open position is also mounted for pivotal movement at the bottom in either direction about an upper longitudinal axis. A generally vertical frame member is mounted in the central plane of the gate, with upright shafts mounted on each side of the frame member and spaced from and tilted toward the central plane of the gate. Vehicle contact rollers are rotatable and axially slidable on the shafts to reduce bumper scuffing. An improved torsion spring device stores energy when the closed gate is pivoted about the longitudinal axis to an unlatching tilted posture by vehicle thrust against either of the rollers. The spring device rebounds the unlatched gate from the vehicle to an open position.

Still another aspect of the present invention is an improved hooking combination engageable at the lower gate corners to prevent wires tensioned between gate ends from overstraining a gate frame in which the gate ends are structurally connected only at the top. The hooking structure includes at each end of the gate a horizontal gate-borne arm with upward and downward extending terminal projections and a stationary support. The stationary support bears top and bottom hooking bars which are disposed to lap over the gate-borne projections when the gate is in its normal closed position. The top hooking bar extends over and behind the upward projection and the bottom hooking bar extends under and behind the downward projection when the gate is in the normal closed position.

DESCRIPTION OF THE DRAWINGS

For a more complete understanding of the present invention and for further objects and advantages thereof, reference may now be had to the following description taken in conjunction with the accompanying drawings, in which:

FIG. 1 is a fragmentary front view of the present automatic gate;

FIG. 2 is an enlarged side view of the post pivot joint structure of the gate;

FIG. 3 is a sectional view taken generally along the section line 3—3 in FIG. 2;

FIG. 4 is a top view of the high set post of the invention;

FIG. 5 is a horizontal sectional view of the torsion spring mechanism of the invention;

FIG. 8 is a side view of the lower part of the gate actuating structure of the present gate;

FIG. 9 is a top view of the strap arms holding the upper ends of the contact roller carrying shafts shown in FIG. 8;

FIG. 10 is a cross-sectional view taken generally along the section line 10—10 in FIG. 8;

FIG. 11 is a cross section of the bumper roller taken generally along the section line 11—11 in FIG. 8;

FIG. 12 is a partially broken away view of the gate hooking mechanism at the latch end of the gate;

FIG. 13 is a cross-sectional view taken generally along the section line 13—13 in FIG. 12;

FIG. 19 is a side view of the latch keeper mechanism for the invention; and

FIG. 20 is a top view of the latch keeper shown in FIG. 19, and associated parts.

DESCRIPTION OF THE PREFERRED EMBODIMENTS

Figure 6A:
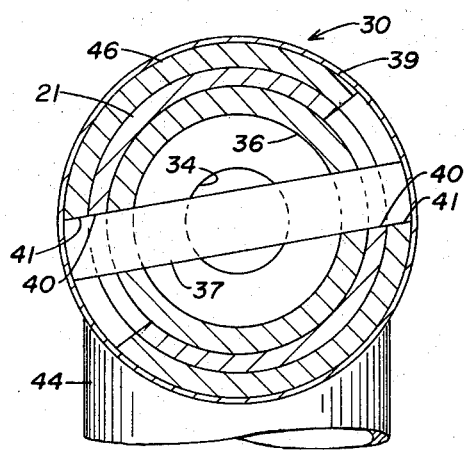
FIGS. 6a—c are cross sections taken generally along section line 6—6 of FIG. 5, illustrating the torsion spring mechanism of the gate in different operational positions.

Referring to FIG. 1, the present gate comprises a fence holding frame with vertical posts 1 and 2 set in concrete poured into corresponding post holes and into a channel connecting the two post holes. The concrete also anchors the lower end of a brace 3. Posts 1 and 2 are connected at their upper ends by a horizontal strut 4. A plate 5 is sandwiched diagonally between adjacent ends of post 2 and strut 4, as by welding to each of these members. Plate 5 extends downward to the upper end of brace 3 to which it is welded, and plate 5 extends upward beyond the post 2 and strut 4 where the plate 5 is perforated to receive a threaded lower end of a brace 6. Brace 6 may be adjusted by manipulating nuts 7 to affect the posture of a high set post 8 in the plane of the closed gate.

High set post 8 is constructed from "I" structural steel and is integral with a base plate 9 shown in FIGS. 1 and 2. Base plate 9 is perforated towards each end to receive threaded studs 10 which are integral with and project from pivot blocks 11 on which the base plate 9 is seated. One of the pivot blocks 11 rests against the outside of each flange of post 1. As best shown in FIG. 3, post 1 is constructed of "I" structural steel of larger cross section than the high set post 8, so that nuts 12 on the threaded ends of studs 10 have room for being turned. A shaft 13 passes horizontally through suitable openings in the flanges of post 1 and in the pivot blocks 11, the web of post 1 being cut away to make room for shaft 13. Shaft 13 may be welded to the inner sides of the flanges of post 1.

When it is desired to adjust the posture of high set post 8 in the plane perpendicular to the closed position of the gate, the gate is opened in the direction towards which the upper end of the high set post is to be shifted. The nut 12 on the stud 10 on the now tensioned side of the high set post 8 is then unwound sufficiently to insert a shim of proper thickness between the upper surface of the pivot block 11 and the base plate 9. Then, with the shim in place, the nut 12 is tightened again.

The upper end of brace 6 is terminated by a plate 14 (FIGS. 2 and 4) which is secured to the high set post 8 by bolts 15 which are welded to the inner sides of the flanges of post 8. The plate 14 is further secured against downward displacement by projections 16 on the flanges of the post and against upward displacement by a plate 17 secured to the top of the post.

The axle 18 of the gate is mounted between the plate 17 and a U-bracket 19 fixedly secured to the lower end of the high set post 8. The lower end of axle 18 is a rectangular loop 20 into which the exposed end of an inner tubular member 21 of the gate projects as shown in FIGS. 2 and 5. A cross pin 22 extends through openings in the sides of the loop and the tubular member to hold the tubular member from displacement and axial rotation. A pivot bolt 23 extends through a central opening in the bottom of rectangular loop 20 and through perforations in the top and bottom elements of the U-bracket.

The upper end of axle 18 is tubular and has spaced cross walls 24 and 25 (FIG. 2). A pivot bolt 26 is journaled in an opening in the top plate 14 and press fitted through central openings in the cross walls of the tubular axle 18 below. The head of this bolt above plate 14 has a perforated extension 27 for receiving the upper end of the guy 28, the effective length of which can be adjusted by a nut 29. The guy, axle and inner tube 21 move in unison when the gate is opened and closed. The axis of rotation is through pivot bolts 26 and 23 and is appropriately tilted so the gate will swing from its open position to its closed position by gravity.

An initially stressed torsion spring mechanism is disposed within an outer tubular member 30 which forms the upper portion of the gate. The torsion spring mechanism is best shown in FIGS. 5, 6a–c and 7a–c. The inner tube 21 extends into the outer tubular member 30. A torsion bar spring 31 housed in inner tube 21 comprises a cylindrical shaft 32 which is integral with flaired ends 33 produced by upsetting. These flaired ends are each welded to the radial ring portion 34 of a yet larger diameter member 35 having a cylindrical portion 36. The two cylindrical portions constitute the torsion spring's terminals and have a working fit with the interior of the inner tube 21.

Figure 7A:
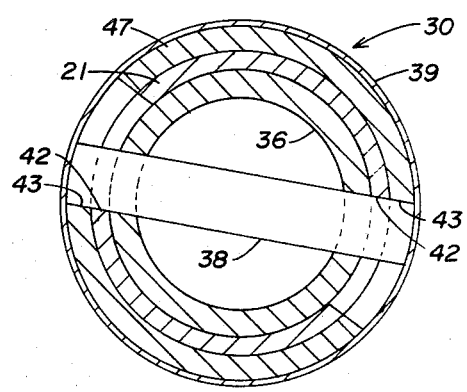
FIGS. 7a–c are cross sections taken generally along section line 7—7 of FIG. 5, showing operational positions correlated with the operational positions shown in FIGS. 6a–c.
Figure 6B:
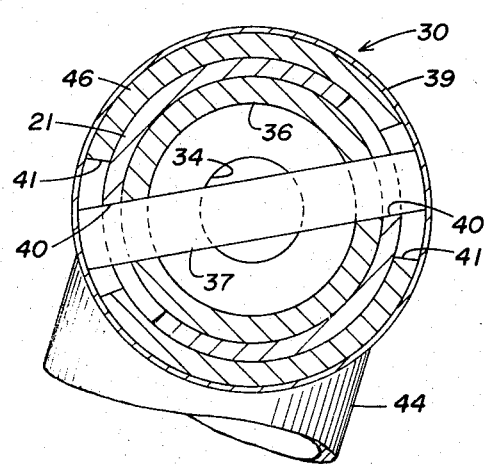

Square cross pins 37 and 38 function at opposite ends of the spring to communicate torque between the cylindrical spring terminals and the inner and outer tubular members. Openings are provided in the walls of the spring's cylinders 36 and the walls of the inner and outer tubular members 21 and 30 for containing the cross pins 37 and 38 which extend through the walls perpendicular to the spring's axis. Cover rings 39 surround the outer tubular member beyond the ends of the cross pins and may be held in position in any conventional manner. The openings in the spring's terminal cylinders 36 are of the same size as the cross pins 37 and 38, but the openings through the inner and outer tubular members 21 and 30 are circumferentially elongated as illustrated in FIGS. 6a and 7a.

In the cylindrical spring terminals 36, the openings for the cross pins are so positioned in the unstressed spring 31 that the center line of the openings for cross pin 37 at one end of the spring 31 are in the same plane as the center line of the openings for cross pin 38 at the other end of the spring 31. By comparing the angular position of cross pin 37 in FIG. 6a with the angular position of cross pin 38 in FIG. 7a, it will be noted that the spring 31 is assembled into the gate partially wound. This partial winding is accomplished by having the openings in tubular members 21 and 30 for cross pin 38 out of angular alignment with corresponding openings for cross pin 37 at the other end of the spring 31. This gives the spring 31 an initial torsional stress which forces the cross pin 37 clockwise against the shoulders 40 of the wall of the inner tube 21 and the shoulders 41 of the wall of the outer tubular member 30, and forces the cross pin 38 at the opposite end of the spring counterclockwise against shoulders 42 of the inner tube and shoulders 43 of the outer tubular member. This initial stress tends to keep the gate in its normal vertical position as indicated by the vertical disposition of arm 44 in FIG. 6a. In assembling the spring into the gate, the cross pin 37 is inserted after cross pin 38 is in place. The spring's terminal cylinder 36 at this end is provided with notches 45 (FIG. 5) which can be engaged by a special wrench to twist the spring so openings are aligned for the insertion of cross pin 37.

Figure 7B:
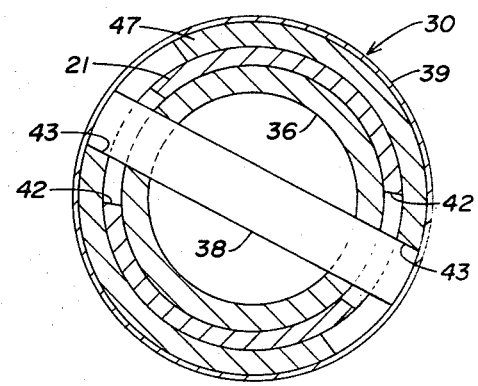
Figure 7C:
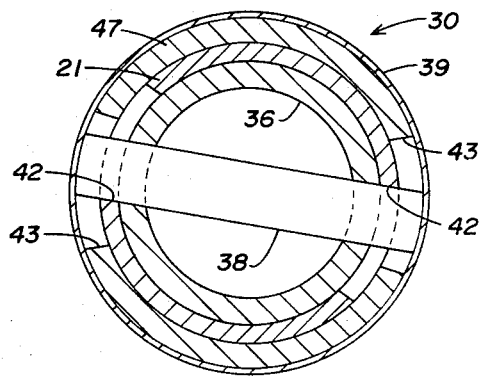
Figure 6C:
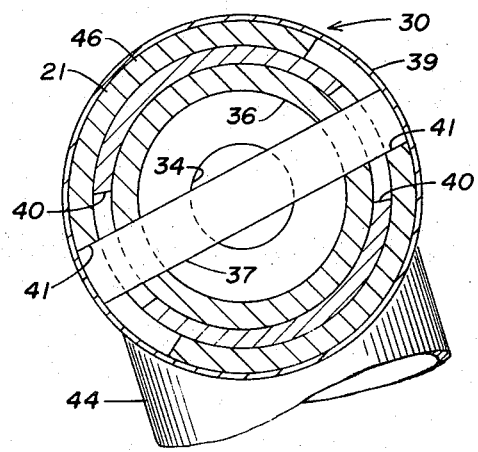

The operation of the spring mechanism of this gate is similar to that of the gate disclosed in the previously identified copending patent application Ser. No. 3318. When the bottom of the gate is moved by the action of a vehicle bumper, the longitudinal member 30 turns in place while the inner tube 21 is held from turning by the cross pin 22 at the gate axle 18. Clockwise rotation of the outer tubular member 30, as indicated by the slant of pendant arm 44 in FIG. 6b, leaves the shoulders 40 of the stationary inner tube 21 holding the cross pin 37 against clockwise movement, while the cross pin 38 at the other end of the spring is advanced clockwise by shoulders 43 of the outer tubular member, as shown in FIG. 7b, thereby storing energy by increasing the angular disparity of the two ends of the spring 31 from that of the initial twist. Similarly, when the outer tubular member 30 is rotated counterclockwise from its normal position, as indicated by the angular position of pendant arm 44 in FIG. 6c, the cross pin 37 is moved counterclockwise by the advance of shoulders 41 while the cross pin 38 is held stationary by the shoulders 42 of the inner tube 21, as shown by a comparison of FIGS. 7a and 7c. This likewise stores energy by increasing the angular disparity between the spring ends.

For the greater part of the length of the gate, the outer tubular member 30 is thin walled, but thicker walled sections 46 and 47 are placed where pendant arms 44 and 48 are attached and openings are cut for cross pins 37 and 38. These two thicker walled sections are connected by a thinner walled section 49 as shown in FIG. 5.

Vehicle bumper contact parts are carried by the lower portion of pendant tubular arm 48 as shown in FIGS. 1, 8, 9, 10 and 11, and include two upright bumper contact rollers 50 and a single horizontal tractor wheel contact roller 51. The bumper contact rollers are rotatable and vertically slidable on shafts 52 and are each comprised of an inner steel tube 53 (FIG. 11), an outer elastomeric cover 54 and a bushing 55 inside each end of the steel tube. The upper ends of the two shafts 52 are rigidly secured to converging ends of vertically wide straps 56 which are secured to opposite sides of the wall of pendant arm 48 to form a supporting triangle for the upper end of each shaft. As the wall of the tubular pendant member is thin, vertically spaced contact points between the straps and the wall are provided by vertically extending strap lugs 57.

The lower ends of shafts 52 are rigidly secured to opposite ends of a thin plate 58 which is welded to the lower end of pendant arm 48. Just above this plate is a horizontal hollow shaft 59 connecting and rigidly secured to pendant arms 44 and 48 and extending beyond arm 48 to form the axle for roller 51. Braces 60 connect opposite sides of shaft 59 at a point near the roller with the plate 58.

The rollers 50 are set some distance to the sides of the central plane of the gate, which is occupied by the pendant member 48. When a roller 50 is pushed by an automobile bumper, the distance of the bumper's contact point from the axis of tubular member 30 shortens as the roller is advanced to a position directly under member 30. During this shortening of distance, the roller 50 being pushed slides upward on the supporting shaft 52, occupying space otherwise left between the top of the roller 50 and the bottom of straps 56 and thereby avoiding scuffing of the bumper. Scuffing is also avoided by rotary movement of the roller during lateral movement between the bumper and the roller.

Gate hooking mechanism for the present gate is shown in FIGS. 1, 12, 13, 14 and 15. A thin walled section of the longitudinal frame member 30 of the gate is secured to the thick walled section 47 (FIG. 1) and extends to the latch carrying guy supported diagonal plate 61 sandwiched between this thin walled section and an equally thin walled pendant arm 62. Pendant arms 62 and 44 are at opposite ends of the gate and carry barb wires 63 strung between them for the livestock barrier of the gate. Wires are strung on alternate sides of pendant arm 48 and one wire is attached to a cross bolt 64 at the end of the hollow shaft 59 as shown in FIG. 10.

To the bottom of pendant arm 62 a thin plate 65 is welded to extend horizontally toward the post 66 when the gate is in its normal closed position. As shown in FIGS. 12 and 13, this plate carries an integral terminal block 67 which extends perpendicularly upward and downward equal distances from plate 65. A bracket 68 held to the post 66 by a bolt 69 has two hook bars 70 and 71 extending horizontally, one of the bars extending over and the other under the normal position of block 67. Outward from this block these bars turn 90° toward the plate 65 to form hooks for retaining block 67 while the gate is in its normal closed position.

Figure 14:
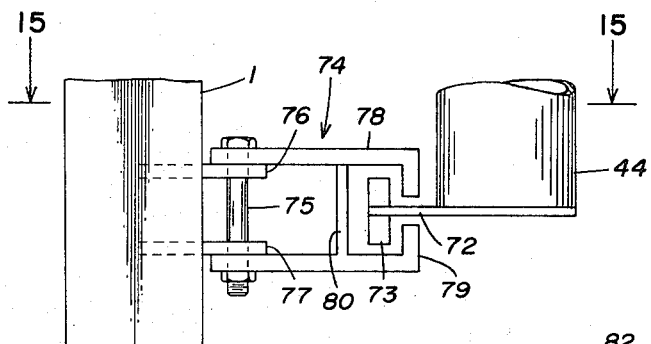
FIG. 14 is a front view of the hooking mechanism at the axle end of the present gate.
Figure 15:
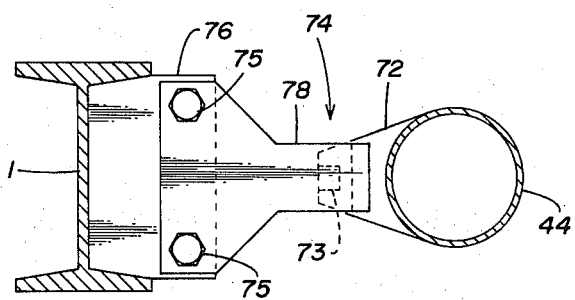
FIG. 15 is a sectional view taken generally along the section line 15—15 in FIG. 14.

At the other end of the gate, a plate 72 and block 73 shown in FIGS. 14 and 15 correspond to plate 65 and block 67 just described. However, the upper horizontal hook bar 78 and lower horizontal hook bar 79 of the bracket 74 are connected at 80, whereas hook bars 70 and 71 are connected by a post fitting segment 81. Bracket 74 is secured by bolts 75 to vertically spaced lugs 76 and 77 of post 1.

As livestock respect barb wires, hard pressure against the wires of this gate by livestock should be a rare occurrence. It would be doubly unusual for livestock to apply hard pressure to the wires as low down as an automobile bumper. Even at this low level it would require, for instance, 55 pounds to overcome the initial pressure of the torsion bar spring and thus cause the bottom of the gate to yield. However, pressure against the bottom wires results in amplified wire tension which could overstrain frame members of the gate, were it not for the drawing of blocks 67 and 73 against the hook bars anchored to the posts at the opposite ends of the gate. Also, an upward force exerted against the gate would lift the gate no further than make contact between the plate 65 and the upper hook bar 70. The normal height of the guy supported end of the gate, in the gate's closed position, is maintainable on account of the light weight of that end of the gate, the direct line of tension through the guy and the adjustable brace 6, and the direct line of pressure through the longitudinal frame member 30 and strut 4.

Figure 17:
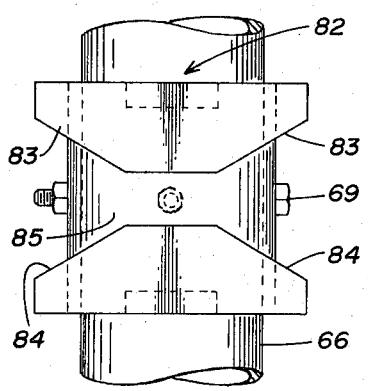
FIG. 17 is a side view of the camming end of the hooking mechanism shown in FIG. 16.
Figure 16:
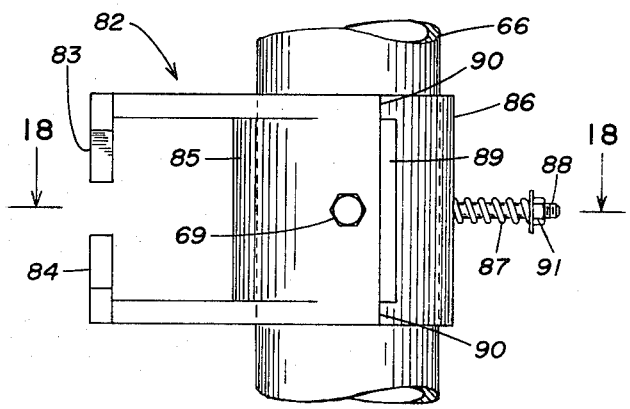
FIG. 16 is a front view of another embodiment of the hooking mechanism for use at the latched end of the present gate.
Figure 18:
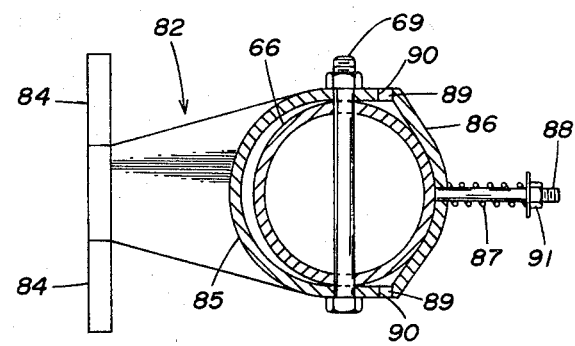
FIG. 18 is a cross section taken generally along section line 18—18 in FIG. 16.

For long gates where the height of the latched end of the gate is more difficult to control, a bracket 82, shown in FIGS. 16, 17 and 18, is preferably substituted for bracket 68 shown in FIG. 12. Bracket 82 differs from bracket 68 by having vertical cam sections 83 and 84 at the ends of the top and bottom hook bars, respectively, as shown in FIG. 17. These cam sections operate to scoop in the plate 65 (shown in FIG. 12) from variations in height when the gate swings to its normal closed position. Bracket 82 also differs from bracket 68 by having the vertical segment 85 substituted for vertical segment 81 of bracket 68, the latter being tightly fitted to the side of the post 66, whereas segment 85 is normally spaced from the post to permit bracket 82 some vertical pivotal movement about the bolt 69 when the plate 65 strikes a cam section 83 or 84 of the bracket.

When bracket 82 is not forced to an upwardly or downwardly slanted position to accommodate the plate 65, it is maintained in its normal horizontal position by a pressure plate 86 and compression spring 87 mounted on a bolt 88 secured to the post behind bracket 82 in a line perpendicular to the bolt 69 and the post. The pressure plate 86 is perforated in the center to fit loosely on the bolt, and its sides are recessed at 89 intermediate of their top and bottom so that top and bottom shoulders 90 of the pressure plate make contact with adjacent top and bottom portions of bracket 82. When bracket 82 is pivoted downwardly or upwardly from its normal horizontal position, the bottom or top of the pressure plate is forced away from the post and the center of the pressure plate is thereby moved outward against the pressure of the spring. The pressure of the spring is adjustable by the nut 91.

The latch plate 92 shown in FIGS. 1, 19 and 20 is pivotally secured to the hinge pin 93 at the outer sides of two hinge pin holding sections 94 formed at the upper end of diagonal plate 61 with a space between them where the lower end of guy 28 is looped about the hinge pin.

The latch keeper 95 is carried by two perpendicular integral bolts 96 mounted in suitable openings in spaced angle irons 97 and 98 welded to the top of post 66 parallel to the latch keeper. When the gate is in its normal closed position, the latch plate is held flat against the bottom of the recess 99 of the latch keeper by a strap spring 10 (FIG. 1).

When vehicle thrust is applied to one of the contact rollers 50 or 51 of the latched gate in an amount sufficient to overcome the initial stress of the torsion bar spring, the gate yields at the bottom, becoming tilted, the torsion bar spring is additionally wound and the leading edge of the latch plate is raised until it emerges above the holding side of the latch keeper recess, as shown by the dotted position in FIG. 19. The latch plate now swiftly rides out of the recess in response to the force of the torsion bar spring, and spring stored energy is converted into kenetic energy as the top of the gate is flung forward to restore the gate from its tilted posture to its vertical posture.

Since the mass of the gate is concentrated along the top, the forward momentum of the top of the gate swings the entire gate forward on its vertical axis, away from the vehicle and to an open position. The gate thereafter returns to its latched closed position by gravitational force due to the inclination of its vertical axis. The closing movement of the gate may be delayed by a device such as is described in the co-pending patent application Ser. No. 3318.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a gate mounted at one end for rotation about a vertical axis in either direction from a closed position to an open position, and also mounted for pivotal movement about an upper longitudinal axis from a vertical latched closed position to a tilted latch releasing posture, the combination comprising:

a pair of vertical structural members serving as frame ends of the gate, a unitary longitudinal frame connection between said frame ends integral with the upper ends thereof, wires tensioned between said frame ends below said unitary longitudinal frame connection, engageable hooking structure including parts connected to said frame ends for limiting the drawing towards each other of the lower portions of said frame ends from additional wire tension while the gate is in its normal vertical closed position, an upright post supporting said gate for said rotation from its closed position to its open positions, pivot means mounted on said upright post for enabling adjustment of the posture of said post, vehicle contact rollers rotatably and axially slidably mounted with upright axes on opposite sides of said gate for contact with a horizontal vehicle bumper moved against said gate for opening it, and resilient means for storing energy when the closed gate is tilted by vehicle thrust against one of said rollers to a latch releasing plane and for then flinging the unlatched gate to an open position about said vertical axis.

2. The gate of claim 1 wherein said pivot means on said post comprises a base plate seated upon a plurality of laterally spaced pivot blocks pivotally supporting said post about a horizontal axis, each of said pivot blocks having a threaded member extending through said base plate, and nuts provided for connection to said threaded members above said base plate to allow adjustment for accommodation of shim buildup between said pivot block and said base plate to adjust the posture of said post in the plane of said members.

3. The gate of claim 1 wherein said vehicle contact rollers are mounted on upright shafts supported from said gate and spaced apart from and tilted toward the central plane of said gate.

4. The gate of claim 1 wherein said hooking structure includes on the lower portion of each frame end of said gate a horizontal arm with upwardly and downwardly extending terminal projections, a stationary support bearing top and bottom hooking bars disposed to lap said gate-borne terminal projections when said gate is in its normal closed position, and said top hooking bar extending over and behind said upper projection and said bottom hooking bar extending under and behind the downward projection when said gate is in its normal closed position.

5. A vehicle operated gate mounted at one end for rotation about a vertical axis in either direction from a closed position to open positions comprising:

a generally rectangular livestock barring unit mounted for pivotal movement about an upper longitudinal pivot axis from a normally vertical posture to tilted postures, latch means mounted on the livestock barring unit to pivot therewith about said longitudinal pivot axis from gate holding to predetermined latch releasing angles, a generally vertical frame member mounted in the central plane of the livestock barring unit, a pair of vehicle contact rollers mounted axially upright on each side of said frame means, spaced from and tilted axially toward the central plane of said livestock barring unit with end play being provided for compensatory axial sliding accompanying pivoting of said livestock barring unit about said horizontal pivot axis due to vehicle contact, and resilient means connected to said livestock barring unit for storing energy when the closed gate is pivoted about said longitudinal axis to an unlatching tilted posture by vehicle thrust against either of said contact rollers and for rebounding the gate from the vehicle to an open position upon being unlatched.

6. A vehicle operated gate mounted at one end for rotation about a vertical axis in either direction from a closed position to open positions comprising:

a generally rectangular livestock barring unit mounted for pivotal movement about an upper longitudinal pivot axis from a normally vertical posture to tilted postures, latch means mounted on said livestock barring unit to pivot therewith about said longitudinal pivot axis from gate holding to predetermined gate releasing angles, a generally vertical frame member mounted in the central plane of the livestock barring unit, a pair of shafts mounted axially upright on opposite sides of said frame member, spaced from and tilted toward the central plane of the livestock barring unit, vehicle contact rollers axially slidable on each of said shafts with end play being provided which is compensatory for the vertically curvilinear movement of the shaft accompanying pivoting of the livestock barring unit upon vehicle contact, and resilient means connected with said livestock barring unit for storing energy when the closed gate is pivoted about said longitudinal axis to an unlatching tilted posture by vehicle thrust against either of said rollers and for rebounding the unlatched gate from the vehicle to an open position.

* * * * *